United States Patent [19]

Scarrow

[11] Patent Number: 5,343,995
[45] Date of Patent: Sep. 6, 1994

[54] AUGER OR CONVEYOR DISCHARGE SPOUT

[75] Inventor: Dennis A. Scarrow, Saskatchewan, Canada

[73] Assignee: FAB TEC Manufacturing Ltd., Saskatchewan, Canada

[21] Appl. No.: 110,698

[22] Filed: Aug. 23, 1993

[51] Int. Cl.⁵ .............................................. B65G 21/10
[52] U.S. Cl. ................................ 198/311; 198/535; 198/536; 198/671
[58] Field of Search ................ 198/671, 535, 311, 536

[56] References Cited

U.S. PATENT DOCUMENTS

| | | | |
|---|---|---|---|
| 1,005,049 | 10/1911 | Lorenzen | 198/536 X |
| 1,057,738 | 4/1913 | Jennings | 406/161 |
| 1,373,659 | 4/1921 | Harding | 198/536 X |
| 1,745,110 | 1/1930 | Morton | 198/536 |
| 2,724,516 | 11/1955 | Wejshaar | 198/536 |
| 3,144,928 | 8/1964 | Roloson | 198/536 |
| 3,448,847 | 6/1969 | Csimma | 198/536 |
| 3,451,725 | 6/1969 | Waldrop | 406/161 |
| 3,510,171 | 5/1970 | Bacon | 406/161 |
| 3,867,773 | 2/1975 | Gunderson | 406/161 X |
| 5,234,094 | 8/1993 | Weyermann et al. | 198/311 X |

Primary Examiner—Cheryl L. Gastineau
Attorney, Agent, or Firm—Murray E. Thrift; Adrian D. Battison; Stanley G. Ade

[57] ABSTRACT

A controllable discharge spout assembly is used on the discharge end of an auger or other conveyor. The discharge spout assembly has an auxiliary, downwardly tapered spout that is mounted for universal movement below the conventional discharge of the conveyor. This control mechanism extends from the spout to an operator's station near the inlet end of the auger so that an operator standing on the ground may control the direction of flow of material from the conveyor.

18 Claims, 6 Drawing Sheets

AUGER OR CONVEYOR DISCHARGE SPOUT

FIELD OF THE INVENTION

The present invention relates to grain conveyors and more particularly to a spout for directing the flow of grain discharge from a grain conveyor.

BACKGROUND

With conventional grain conveyors, including auger conveyors, a conveyor operator has no control over the direction at which the material leaves the conveyor. This leads to considerable labour and inconvenience, since the operator must position the vehicle, container or granary directly under the flow of material coming from the conveyor in order to fill it evenly. With a vehicle, the operator must move the vehicle along as filling continues inwards to provide a relatively uniform loading. After the grain is loaded, it is then necessary for someone to climb into the vehicle, container or granary to move the grain manually into the corners of where it did not flow on its own. This process is both labour intensive and, in many respects, unsafe. Sectional spouts have been provided in the past to alleviate some of this problem, but these can only be adjusted by an operator at the discharge end of the conveyor.

The present invention proposes an apparatus for directing the flow of grain from the conveyor that is readily controlled by the operator.

SUMMARY

According to one aspect of the present invention there is provided a discharge spout assembly for controlling the direction of grain delivery from a grain conveyor of the type having a fixed outlet, said spout comprising:

a tubular spout with an inlet end and a delivery end;

spout mounting means for mounting the spout on the conveyor with the inlet end of the spout positioned to receive grain from the fixed outlet of the conveyor, the mounting means including pivot means for allowing the orientation of the spout to be altered within a range of orientations; and control means for selectively and controllably varying the orientation of the spout from a location remote from the spout.

When mounted on an auger or other conveyor, the discharge spout assembly may be controlled to deliver the grain where it is required in the receptacle being filled in order to provide an uniform loading. The remote control minimizes the need for the operator to reposition the auger or the receptacle or to enter the receptacle once loading has been completed.

According to another aspect of the present invention, there is provided a grain conveyor incorporating the discharge spout assembly.

As noted above, the conveyor may be an auger type conveyor, this being the most common type of grain conveyor currently in use. The invention is, however, equally applicable to other types of conveyors.

In preferred embodiments of the invention, the control is a mechanical one, using a mechanical linkage between the spout and a control handle accessible to an operator standing on the ground near the inlet end of the auger.

One embodiment of the present invention will be described by way of example in the following. It is to be understood that the invention is not limited to that embodiment and that other embodiments are possible within the scope of the invention.

BRIEF DESCRIPTION OF THE DRAWINGS

In the accompanying drawings, which illustrate an exemplary embodiment of the present invention.

DETAILED DESCRIPTION

Figure 1:
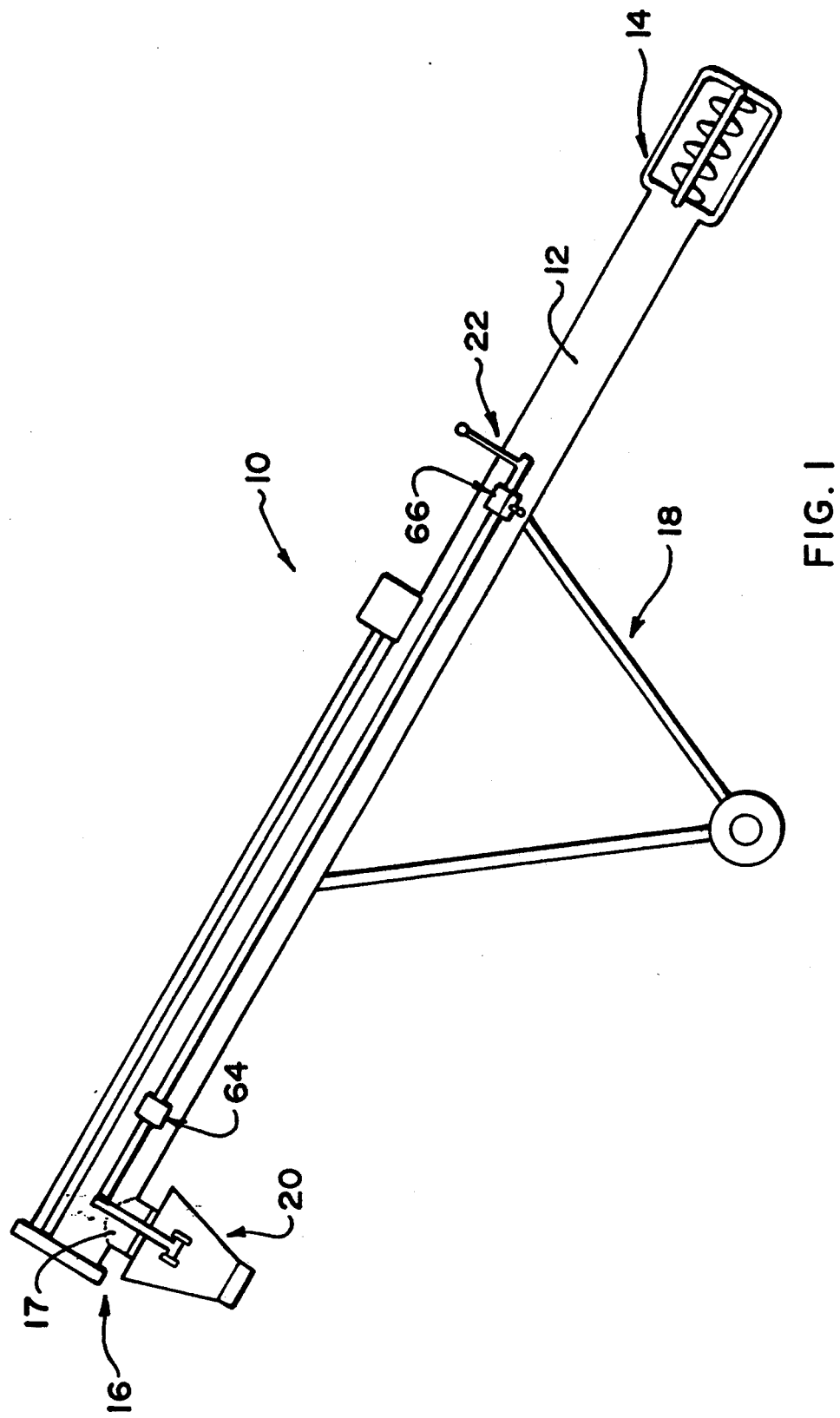
FIG. 1 is side view of an auger equipped with a spout assembly according to the present invention.

Referring to the accompanying drawings, there is illustrated an auger 10 including an auger tube 12 having a lower inlet end 14 and an upper discharge end 16. The discharge from the auger is through a short outlet tube 17 extending from the bottom side of the auger tube at the top end. The auger is supported on the usual wheeled undercarriage 18.

Associated with the auger is a spout 20 that receives the material being discharged from the outlet tube I 7 and directs the flow according to the orientation of the spout. The spout orientation is varied using a control mechanism 22.

Figure 2:
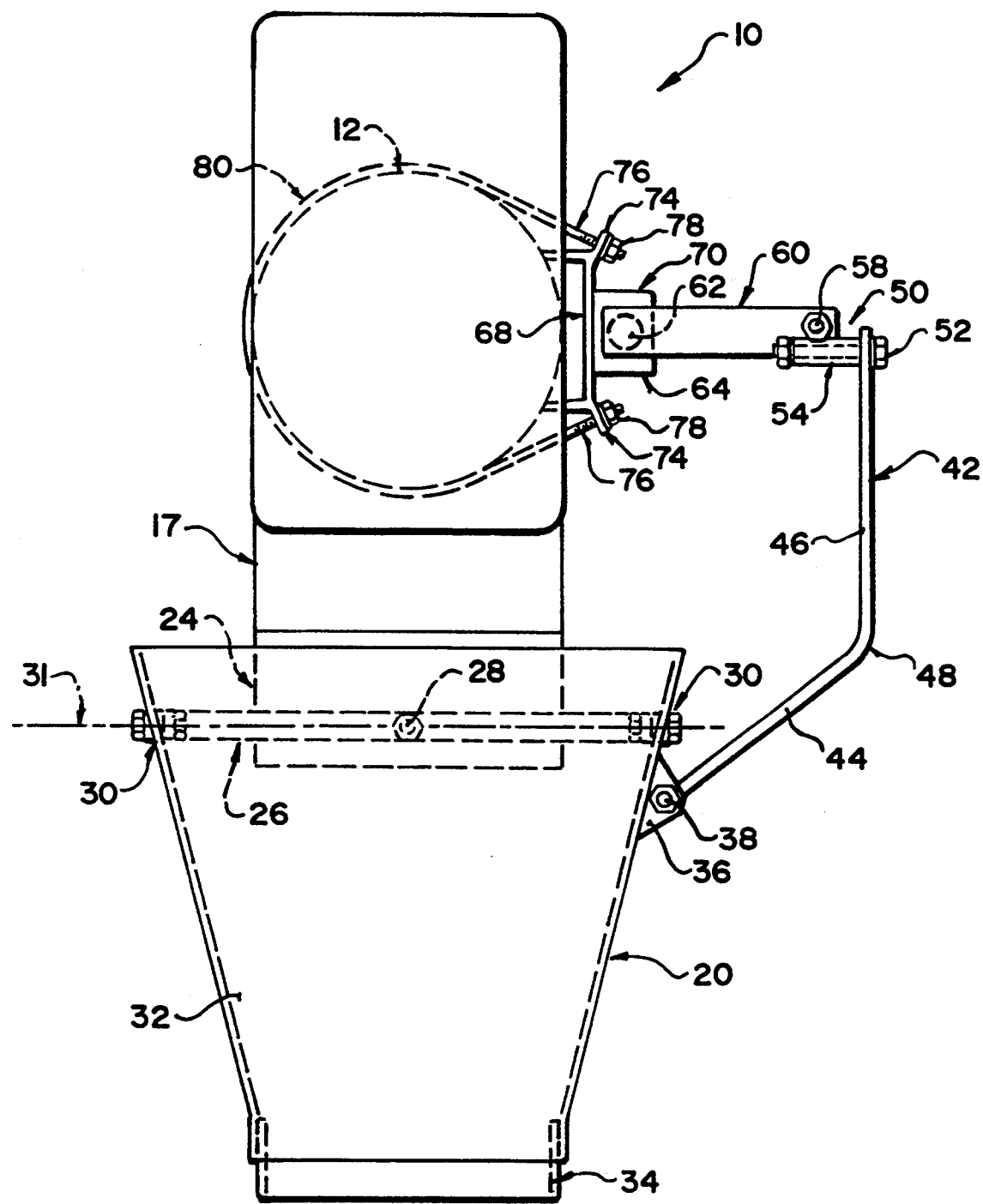
FIG. 2 is an end view of the auger with the spout assembly.
Figure 3:
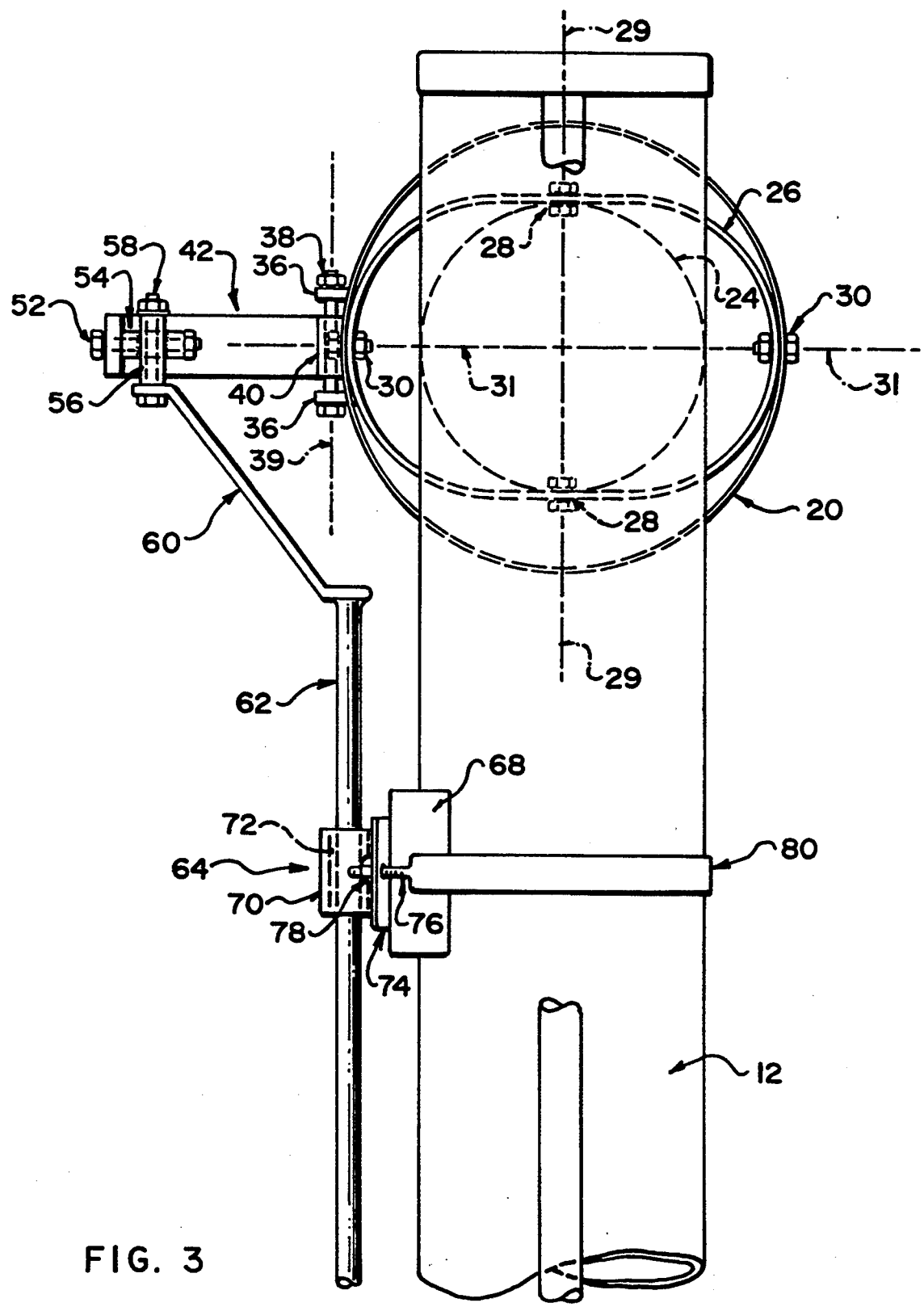
FIG. 3 is a top view of the top end of the auger with the spout assembly.
Figure 4:
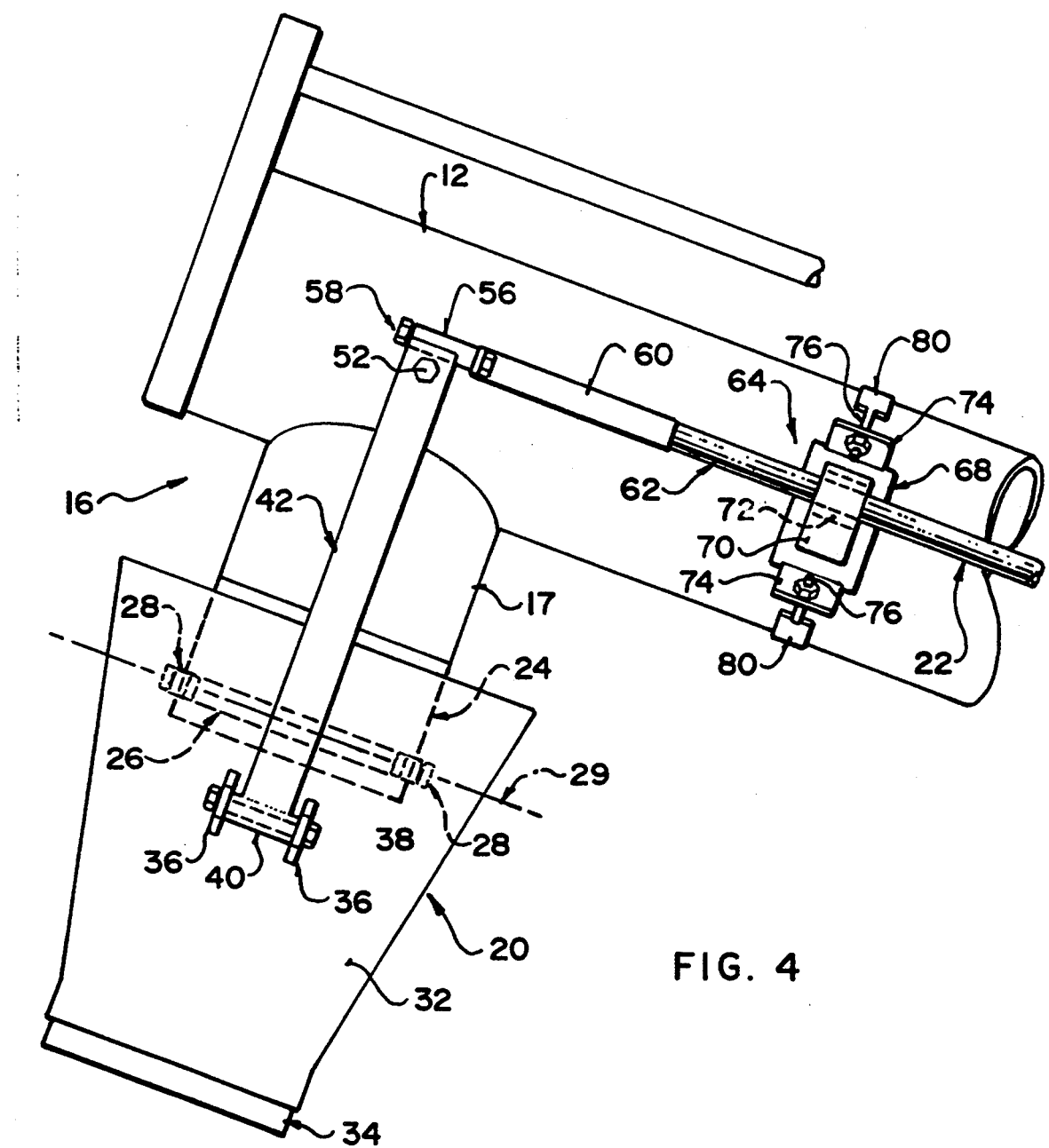
FIG. 4 is a side view of the top end of the auger equipped with the spout assembly.
Figure 5:
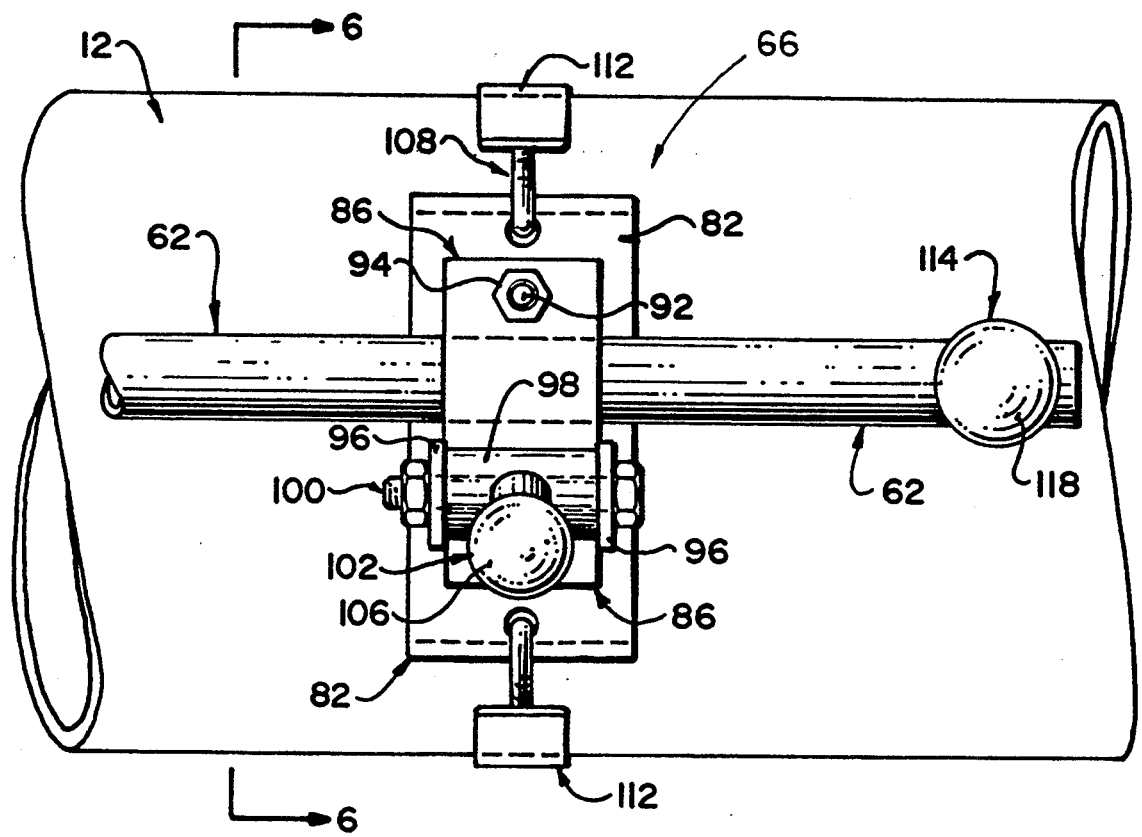
FIG. 5 is a side view of the operator's station.
Figure 6:
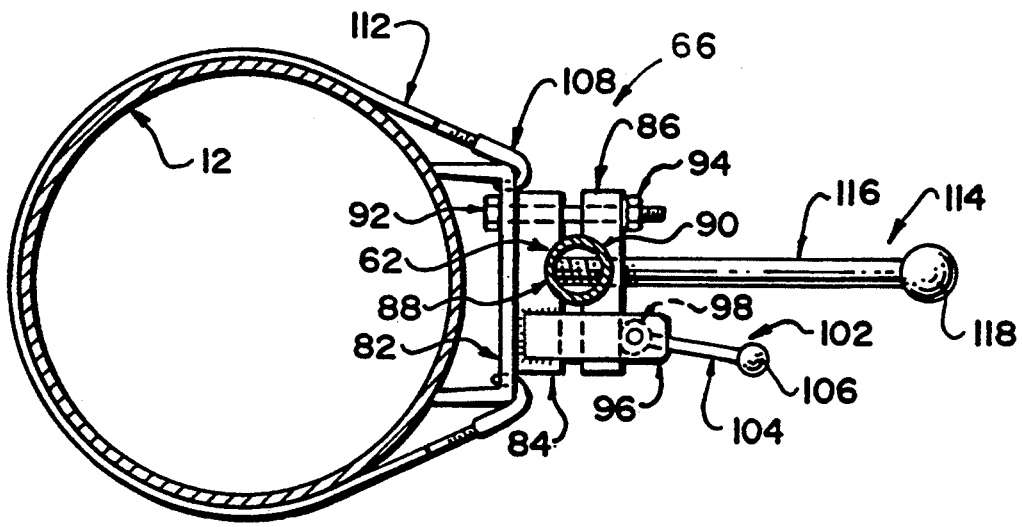
FIG. 6 is view along 6—6 of FIG. 5.
Figure 7:
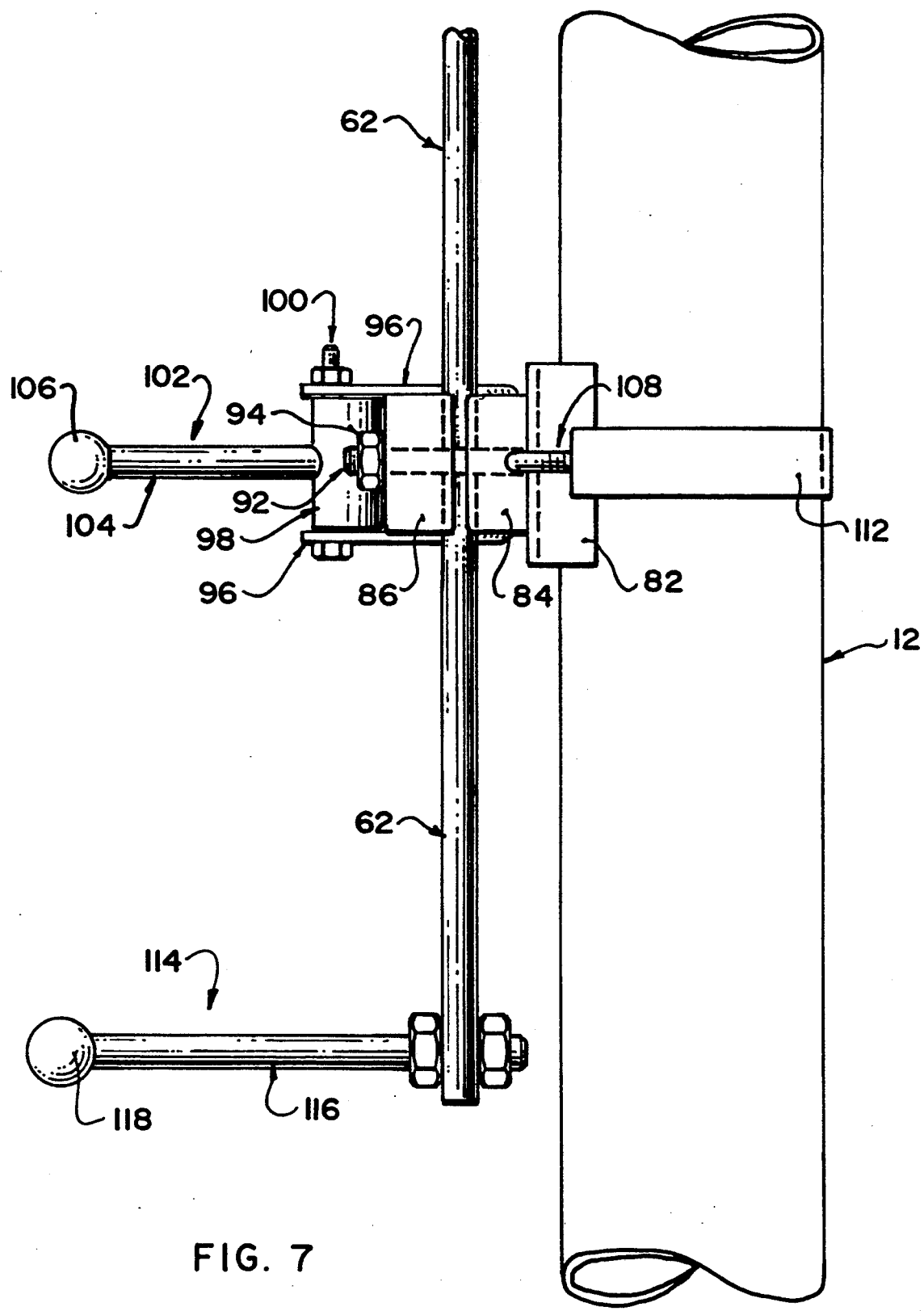
FIG. 7 is a top view of the operator's station.

As illustrated most particularly in FIGS. 2, 3 and 4, the spout 20 includes an extension 24 secured to the bottom end of the outlet tube 17 as a continuation of that tube. Surrounding the extension 24 is a gimbal ring 26. It is connected to the extension by two aligned pivots 28 on opposite sides of the extension. The pivots have a common axis 29 that is transverse to the outlet tube 17 and generally parallel to the auger tube 12. The gimbal ring has two additional pivots 30. These are located on on opposite sides of the ring and have a common axis 31 which is transverse to the gimbal ring and perpendicular to the axis 29. The pivots 30 are connected to a frusto-conically tapered section 32 of the spout 20. At the bottom end of the frusto-conical spout section, there is a discharge ring or adapter 34 of cylindrical configuration. The arrangement is such that the spout may swing in any direction from the vertical to direct material passing through the spout in that direction. The wide, upper end of the spout remains positioned about the extension 24 regardless of the orientation of the spout.

On one side of the spout, below the axis 31, are two lugs 36. These carry a pin 38 aligned on an axis 39 perpendicular to the axis 31. A sleeve 40 rotates on the pin 38 and is secured to the end of a link 42. As illustrated most particularly in FIG. 2, the link has a lower section 44 that slopes outwardly and upwardly from the pin 38 and an upper section 46 that is generally upright. The two sections are joined by an obtuse angle bend 48.

At the upper end of the upper section 46 of link 42 is double pivot coupling 50. This includes a lateral pin 52 secured to the end of the link, a sleeve 54 rotatable on the lateral pin, a sleeve 56 secured perpendicularly to the sleeve 54 and a longitudinal pin 58 fitted rotatably into the sleeve 56. The longitudinal pin 58 is secured to the end of a control arm 60. As illustrated most particularly in FIG. 3, the control arm extends from the coupling 50 towards the auger tube. It converges toward the auger tube in the direction towards the inlet. The control arm is fixed to the end of a long tube 62 that serves as a control rod or shaft of the control assembly 22. The control rod extends along the auger tube and is supported in place by an upper support 64 and a lower support 66.

The upper control rod support 64 includes a channel shaped base 68 that engages the side wall of the auger tube 12. A bracket 70 mounted on the base carries a bearing 72 supporting the control rod 62 for both rotation and linear translation with respect to the upper support.

The base 68 carries two flanges 74 which are apertured to receive the ends of respective ones of two threaded rods 76. A nut 78 on the end of each rod provides for the adjustment of the rod position with respect to the flange 74 and the base 68. The two rods 76 engage opposite ends of a strap 80 that is wrapped about the auger tube 12. Tightening the nuts 78 will thus draw the base 68 and the strap 80 tightly around the auger tube 12 to hold the upper support 64 firmly in place.

The lower support 66 includes a channel shaped base 82 that engages the auger tube and a pair of opposed blocks 84 and 86 with opposed concave seats 88 and 90 configured to engage and clamp the control rod 62 between them. The block 84 is mounted directly on the base 82, while the block 86 is mounted on the base to confront the block 84 by bolt 92 extending through the base and the two blocks, and a nut 94 mounted on the end of the bolt. Adjustment of the nut 94 adjusts the clearance between the two seats 88 and 90 so that they can serve as a guide for guiding linear and rotational movement of the control rod 62.

Two lugs 96 are secured to opposite ends of the block 84 and project outwardly from the block, beyond opposite ends of the block 86. Accommodated between these two lugs is an elongate cam 98. This is eccentrically mounted on a pivot 100 extending between the two lugs. A handle 102 projects from the side of the cam 98. It consists of a rod 104 and a hand knob 106- Rotation of the cam 98 with the handle 102 serves to press the block 86 towards the block 84, thus clamping the control rod 62 between the seats 88 and 90. This will fix the control rod 62 and thus the spout against movement.

The base 82 of the lower support is fastened to the auger tube 12 using two tensioners 108 hooked into holes in the seat 82. The tensioners are connected to opposite ends of a strap 112 that is wrapped around the outside of the auger tube. tightening the tensioners 108 tightens the strap 112 on the auger tube to hold the support in place.

A control rod handle 114 is connected to the end of the control rod. It consists of a rod 116 extending from the control rod and a knob 118 at the end of the handle.

The handle 114 may be used to rotate the control rod 62. This will in turn rotate the control arm 60 and, through the double pivot 50, either push or pull on the link 42. That action will rotate the spout 20 about the longitudinal axis 29 of the gimbal.

The handle 114 may also be used to produce linear displacement of the control rod 62. Movement of the control rod in this way will cause the displacement of the upper end of the link 42 along the auger tube. Through its connection to the spout and thence to the pivot 30, the link 42 will rotate about the axis 31, causing the spout 20 to rotate fore and aft below the outlet of the auger. Consequently, manipulation of the handle 114 will allow material to be discharged in a desired direction.

The reach of the unit can be extended with an additional section on the ring 34.

While one embodiment of the invention is described herein in conjunction with a grain auger, it is to be understood that other embodiments are possible and that the invention has applicability to particulate material conveyors in general and not simply to grain augers. The invention is to be considered limited solely by the scope of the appended claims.

I claim:

1. A discharge spout assembly for controlling the direction of particulate material delivery from a conveyor of the type having a fixed outlet, said spout assembly comprising:

a single tubular spout with an inlet end and a delivery end;

spout mounting means for mounting the spout on the conveyor with the inlet end of the spout positioned to receive particulate material from the fixed outlet of the conveyor, the mounting means including pivot means mounting the spout for rotation about a first axis transverse to the spout and a second axis also transverse to the spout, the first and second axes being mutually transverse, whereby the orientation of the spout may be altered within a range of orientations; and control means for selectively and controllably varying the orientation of the spout from a location remote from the spout.

2. A discharge spout assembly according to claim 1 wherein the pivot means comprise a gimbal including a gimbal ring pivotally mounted on the inside of the spout for rotation about the first axis, and means for mounting the gimbal ring on the conveyor for rotation about second axis.

3. A discharge spout assembly according to claim 1 wherein the spout tapers in size between the inlet end and the delivery end.

4. A discharge spout assembly according to claim 1 wherein the control means comprise a link connected to the spout, and means coupled to the link remote from the first and second axes for displacing the link and thereby rotating the spout about the first and second axes.

5. A discharge spout assembly according to claim 4 wherein the link is pivotally connected to the spout for rotation about a link axis parallel to one of the first and second axes and offset to one side thereof, and the control means comprise means for rotating the link about the other of the first and second axes and means for displacing the link in a direction substantially perpendicular to said one of the link axes.

6. A discharge spout assembly according to claim 5 wherein the control means comprise a control arm, means for mounting the control arm on the conveyor for rotation about a control axis and for displacement of the control arm along the control axis, coupling means coupling the control arm to the link at a position spaced from the control axis and means for selectively and controllably rotating and displacing the control arm with respect to the control axis.

7. A discharge spout assembly according to claim 1 wherein the control means comprise lock means for locking the spout in any orientation within said range.

8. A discharge spout assembly according to claim 6 wherein the means for controllably rotating and displacing the control with respect to the control axis comprise a control rod secured to the control arm and extending therefrom along the control axis, and means for mounting the control rod on the conveyor for rotational movement about the control axis and linear movement along the control axis.

9. A discharge spout assembly according to claim 8 wherein the control means include a control handle secured to and projecting from the control rod at a position spaced from the control arm.

10. A discharge spout assembly according to claim 8 wherein the control means comprise lock means for locking the control rod against rotation about the control axis and against linear movement along the control axis.

11. In a conveyor of the type having a fixed outlet, the improvement comprising a discharge spout assembly for controlling the direction of particulate material delivery from the conveyor, said spout assembly comprising:

a single tubular spout with an inlet end and a delivery end;

spout mounting means mounting the spout on the conveyor with the inlet end of the spout positioned to receive particulate material from the fixed outlet of the conveyor, the mounting means including pivot means mounting the spout for rotation about a first axis transverse to the spout and a second axis also transverse to the spout, the first and second axes being mutually transverse, whereby the orientation of the spout may be altered within a range of orientations; and control means for selectively and controllably varying the orientation of the spout from a location remote from the spout.

12. A conveyor according to claim 11 wherein the pivot means comprise a gimbal including a gimbal ring pivotally mounted on the inside of the spout for rotation about the first axis, and means for mounting the gimbal ring on the conveyor for rotation about second axis.

13. A conveyor according to claim 11 wherein the spout tapers in size between the inlet end and the delivery end.

14. A conveyor according to claim 11 wherein the control means comprise a link connected to the spout, and means coupled to the link remote from the first and second axes for displacing the link and thereby rotating the spout about the first and second axes.

15. A conveyor according to claim 14 wherein the link is pivotally connected to the spout for rotation about a link axis parallel to one of the first and second axes and offset to one side thereof, and the control means comprise means for rotating the link about the other of the first and second axes and means for displacing the link in a direction substantially perpendicular to said one of the link axes.

16. A conveyor according to claim 15 wherein the control means comprise a control arm, means for mounting the control arm on the conveyor for rotation about a control axis and for displacement of the control arm along the control axis, coupling means coupling the control arm to the link at a position spaced from the control axis and means for selectively and controllably rotating and displacing the control arm with respect to the control axis.

17. A conveyor according to claim 11 wherein the control means comprise lock means for locking the spout in any orientation within said range.

18. A conveyor according to claim 16 wherein the means for controllably rotating and displacing the control with respect to the control axis comprise a control rod secured to the control arm and extending therefrom along the control axis, and means for mounting the control rod on the conveyor for rotational movement about the control axis and linear movement along the control axis.

* * * * *